UNITED STATES PATENT OFFICE.

JAMES HENDERSON, OF BELLEFONTE, PENNSYLVANIA.

COMPOUND FOR FURNACE-LININGS AND FIRE-BRICK.

SPECIFICATION forming part of Letters Patent No. 279,159, dated June 12, 1883.

Application filed October 23, 1882. (No specimens.)

To all whom it may concern:

Be it known that I, JAMES HENDERSON, of Bellefonte, county of Centre, State of Pennsylvania, have invented a new and useful Improvement in Compounds for Furnace-Linings and Fire-Brick, of which the following is such full, clear, and exact description as will enable others skilled in the art to which it most nearly appertains to make and use the same.

The object of this invention is to make a compound for furnace-linings, fire-brick, or tuyeres for furnaces, converters, and other metallurgic vessels, of lime, magnesian lime, or magnesia with fluor-spar, which will be refractory and not appreciably expanded or contracted by a change of temperature, and modifications thereto hereinafter claimed.

In carrying out this my invention, I take hydrated lime, magnesian lime, or magnesia, free or nearly free from impurities, such as silica, alumina, or oxide of iron, (a small amount of fluor-spar will not injure the compound,) and mix it with water to a thick mortar and form this into blocks, which are dried at the ordinary temperature, and afterward subjected, in any suitable furnace or kiln, to a high temperature, so as to frit or harden the block. Such furnace may be an open-hearth steel-melting furnace, in which the blocks should be exposed from three to six hours, which causes the lime, or magnesian lime, or magnesia, prepared as above described, to frit and be entirely contracted to the extreme limit of its contraction, and to become very hard and firm. The blocks so treated, as above described, are then ground or pulverized sufficiently fine to pass through a sieve of about three thousand six hundred meshes to the square inch. When lime is used it is better to mix with the water with which it is compounded a proportion of glucose or other binding agent to hold the mass together. To this fritted and pulverized lime, magnesian lime, or magnesia, is added pulverized fluor-spar, preferably in the proportion of ninety-two (92) to ninety-eight (98) per cent. of the fritted and pulverized mass to from eight (8) to two (2) per cent. of flour-spar, by weight. Instead of fluor-spar may be added a mixture of fluor-spar with lime in about equal parts, or with magnesian lime or magnesia in the same proportion, and this mixture of the pulverized fritted mass and fluor-spar, either with or without lime, magnesian lime, or magnesia, is mixed together, and the dry mixture, without the addition of water, may be rammed behind formers into furnaces and other metallurgic vessels, so as to cohere firmly together, and when heat is applied will be thereby made into a solid mass.

This compound may be formed into brick or any other desired form and heated to a high temperature, (about 3,600° Fahrenheit is sufficient,) when it will become set, and will not expand or contract to any appreciable extent on account of changes of temperature.

This compound makes a good lining to furnaces, converters, and other metallurgic vessels, whether formed in the vessel or formed in brick and applied as a lining to the vessel.

I do not wish to limit myself to the proportions stated, as good results may be obtained with other proportions.

What I claim as new, and desire to secure by Letters Patent, is—

1. The refractory compound for furnace-linings and fire-brick, consisting of fritted lime, or its herein-stated equivalent, pulverized, and pulverized (unfritted) fluor-spar, as specified and set forth.

2. The refractory compound for furnace-linings and fire-brick, consisting of fritted lime, or its herein-stated equivalent, pulverized, and pulverized (unfritted) fluor-spar, and lime, or its herein-stated equivalent, as specified.

JAMES HENDERSON.

Witnesses:
WILBUR F. REEDER,
D. H. HASTINGS.